United States Patent [19]

Yamana et al.

[11] Patent Number: 5,014,405
[45] Date of Patent: May 14, 1991

[54] JIG PALLET FOR AN AUTOMATIC ASSEMBLY DEVICE

[75] Inventors: Shinji Yamana, Nagoya; Mikio Nakamura, Toyota; Akihiro Tsuzuki, Aichi, all of Japan

[73] Assignee: Mitsubishi Jidosha Kogyo Kabushiki Kaisha, Tokyo, Japan

[21] Appl. No.: 393,697

[22] Filed: Aug. 9, 1989

[30] Foreign Application Priority Data
Aug. 22, 1988 [JP] Japan ............... 63-109146[U]

[51] Int. Cl.5 .................................. B23P 19/00
[52] U.S. Cl. ...................... 29/33 R; 29/771; 29/784
[58] Field of Search ............... 29/784, 787, 798, 799, 29/771, 822, 711, 824, 823, 33 R, 430, 469

[56] References Cited
U.S. PATENT DOCUMENTS 4,616,411 10/1986 Suzuki et al. ............ 29/822
4,734,979 4/1988 Sakamoto et al. ....... 29/822
4,827,598 5/1989 Sakamoto et al. ....... 29/784 X
4,893,402 1/1990 Hirasaka et al. ......... 29/771

FOREIGN PATENT DOCUMENTS
27177 3/1978 Japan ..................... 29/787

Primary Examiner—William Briggs
Attorney, Agent, or Firm—Abelman Frayne Rezac & Schwab

[57] ABSTRACT

An automatic assembly device includes a jig pallet for carrying and positioning parts used in an assembly line, and a holding device for holding fastener members used to mount the parts to assembled members. A drive is positioned between the fastener member holding device and an external driving device.

5 Claims, 15 Drawing Sheets

JIG PALLET FOR AN AUTOMATIC ASSEMBLY DEVICE

FIELD OF THE INVENTION

This invention relates to improvement of a jig pallet used in an automatic assembly line for automobiles or the like, more specifically to a jig pallet that enables a simplified automatic assembly machine and a simplified supply system for bolts and nuts and the like.

BACKGROUND OF THE INVENTION

In an assembly line for automobiles or the like, a so-called jig pallet is used, which has jig functions in the pallet.

FIG. 15 is a schematic view showing a fuel tank mounting device for use in an assembly line for automobiles. As shown in FIG. 15, a part of complex shape and which is susceptible to deformation, such as a fuel tank 1, is fed from a subline and is placed on a jig pallet 2.

The prior art jig pallet 2, as shown in FIG. 16 (plan view) and FIG. 17 (front view), comprises a base plate 3 with a plurality of columns 4 mounted on it. A flange portion 1a of the fuel tank 1 contacts against the top ends of the columns 4 and is positioned by engaging pins 6 located at the top ends of the columns 4 which engage in location holes 5 formed in the flange portion 1a.

A cutout 3a is provided at the center of the base plate 3. The cutout 3a accommodates a chucking device comprising an air cylinder 8 and a bell crank 9 supported by a carrying arm 7 on which the jig pallet 2 is mounted. Numerals 10 and 11 indicate location holes and pins to position the base plate 3 with respect to the arm 7, and numeral 12 indicates a pressure roller attached to the front end of the bell crank 9.

The device is used to mount a fuel tank 1 to a vehicle body 13 of any one of a variety of car models, and can accommodate various types of fuel tanks, which are then positioned against the lower side of the vehicle body 13.

Normally, the fuel tank 1 is mounted to the vehicle body 13 using fastener members such as bolts and nuts, and the fuel tank mounting device has a device to attach and tighten the fastener members. However, the fuel tank mounting device has had the following problems.

Depending on the car model, the fastener members include hexagonal bolts and nuts, machine screws, and the like, which may be of different diameters. Therefore, multiple types of driving tools (such as nut runners and screw drivers) are required to tighten the fastener members. This requires a complex drive control device to select the appropriate driving tools and guide them around the fuel tank 1.

Additionally, since workers cannot be placed in the vicinity of the mounting device for safety reasons, the fastener members must be automatically fed to the fastening locations.

The driving tools must be moved to pick up the fastener members from a feeder, or, the fastener members must be transferred by compressed air through a plastic hose. However, the former takes a time to move the driving tools, which leads to a retardation in line speed, and the latter has a problem of frequent jamming of the fastener members in the plastic hose, which causes stoppage of operation of the line.

Another example of a prior art fuel tank mounting device is described in Japanese Utility Model Publication Laid-open No. 63-35620/1988.

SUMMARY OF THE INVENTION

It is a primary object of the present invention to provide a simplified fastener member mounting device, which can eliminate the need for supply of fastener members and provide increased line speed and reduced troubles.

In accordance with the present invention, there is provided a jig pallet for the carrying and positioning of parts and for the mounting of these parts, which includes fastener member holding means for holding fastener members which is operative to mount these parts to assembled members and which is rotated by external drive means.

The parts are carried by the jig pallet, and the fastener members are held and carried by the fastener member holding means. After the parts are positioned with respect to the assembled members, the fastener member holding means is rotatably driven by the external drive means to mount the parts to the assembled members.

The jig pallet according to the present invention enables the fastening of mutiple types of fastener members by using the same driving tools and eliminates the need for automatic supply of the fastener members to the assembling locations. As a result, the automatic assembly device is considerably simplified in structure and reduced in cost, and problems such as retardation and stoppage of the assembly line are prevented.

BRIEF DESCRIPTION OF THE DRAWINGS

FIGS. 6 to 14B show a third embodiment of the jig pallet according to the present invention, and respectively show a schematic front view (FIG. 6), a plan view of the jig pallet (FIG. 7), a schematic front view (FIG. 8), a side view (FIG. 9) (a cross sectional view taken along line C—C in FIG. 8), a plan view of a tube clamp (FIG. 10), a schematic partial cross sectional view of a socket holder (FIG. 11), cross sectional views taken along line D—D and line E—E in FIG. 11 (FIGS. 12 and 13), and, a schematic view showing operation of the socket holder (FIGS. 14A and 14B).

DETAILED DESCRIPTION OF PREFERRED EMBODIMENTS

Three embodiments of the jig pallet according to the present invention will now be described in detail with reference to the drawings. First and second embodiments both relate to application of the present invention to a fuel tank mounting device, and a third embodiment relates to application of the present invention to a fuel pipe mounting device. The same parts and components as used in the above described prior art example are indicated using the same reference numbers, and are not described in detail.

First Embodiment

Figure 1:
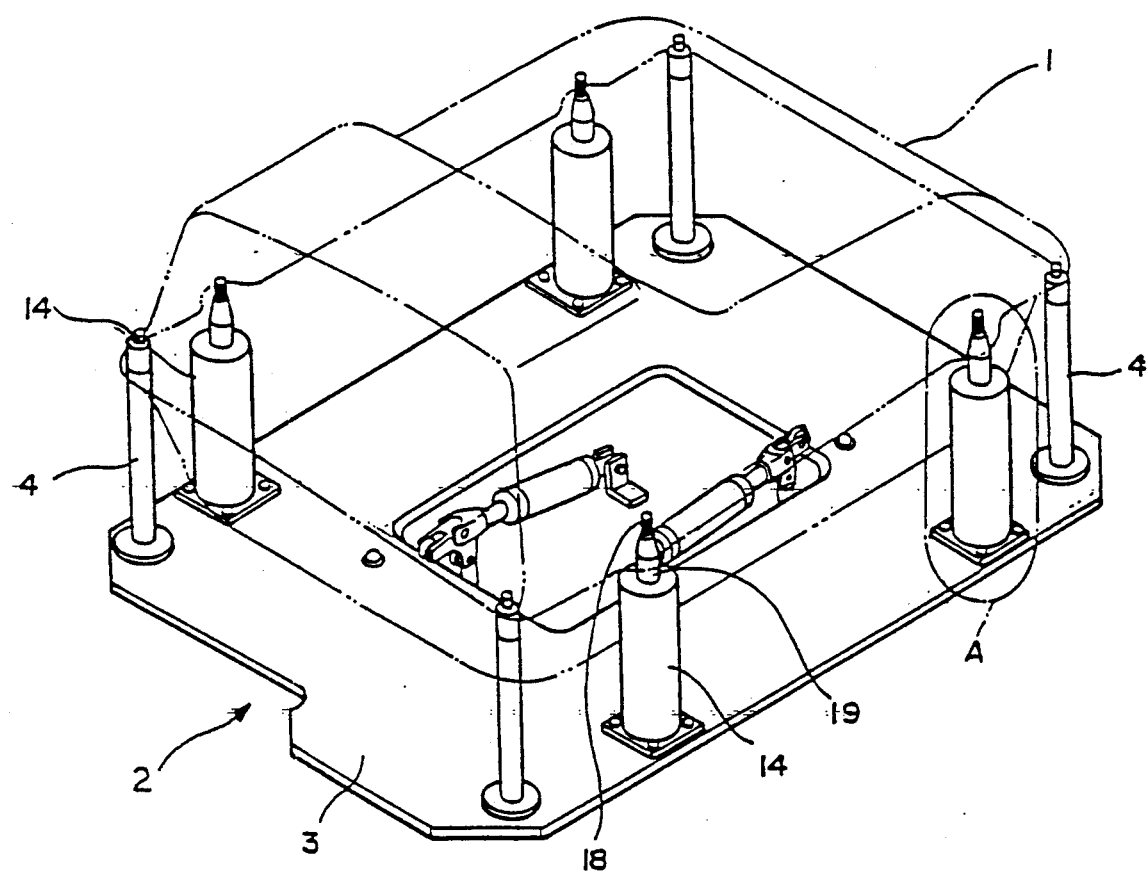
FIG. 1 and FIG. 2 are respectively a schematic according to the present invention (FIG. 1), and, a schematic enlarged cross sectional view of portion A of FIG. 1 (FIG. 2).

Referring to FIG. 1, on the upper face of a base plate 3 of a jig pallet 2 are mounted four columns 4 at the four corners, and two each of socket holders 14 at the front and rear. The columns 4 have the same shape and functions as those used in the prior art example.

Figure 2:
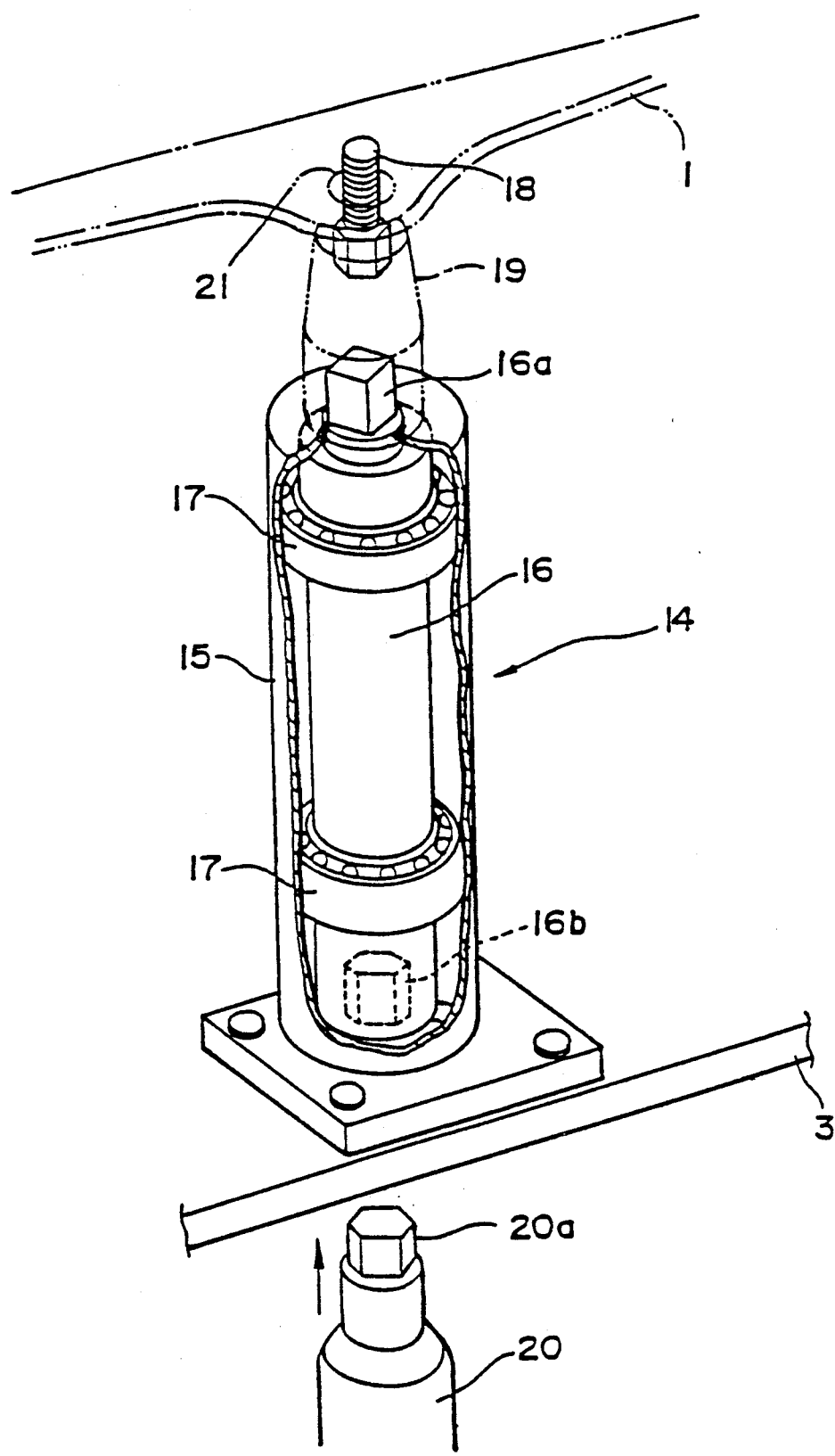

Referring to FIG. 2, each socket holder 14 has a round column-shaped drive bar 16, held in the interior of a hollow cylinderical body 15. The drive bar 16 is rotatably supported by a pair of ball bearings 17 disposed in the body 15, and is provided with a square drive portion 16a at the top end and a hexagonal socket 16b at the bottom.

The square drive portion 16a is engaged with a magnet socket 19, which holds a hexagonal bolt 18 by a magnetic force. The hexagonal socket 16b engages with a hexagonal drive portion 20a of a nut runner robot attached to a tool arm (not shown). A hole (not shown) permits passage of the hexagonal drive portion 20a through the base plate 3 and into the socket 16b.

Functions of this embodiment will now be described. When a fuel tank 1 is to be loaded onto the jig pallet 2 in a subline or the like, the hexagonal bolt 18 is first inserted into the socket 19, and then the fuel tank 1 is loaded onto the columns 4. Transportation by a carrying arm 7 is then carried out, with the hexagonal bolt 18 extending through a bolt hole 21 of the fuel tank 1. When the fuel tank 1 is pressed against the lower side of a vehicle body 13 and correctly positioned, the hexagonal bolt 18 also becomes correctly positioned relative to the vehicle body 13. Then, the hexagonal drive portion 20a of the nut runner 20 is inserted into the hexagonal socket 16b of the drive bar 16 by the tool arm, to drive the drive bar 16.

Since, in this embodiment not only the fuel tank 1 but also the hexagonal bolt 18 is held and carried by the jig pallet 2, the need for an independent supply means for hexagonal bolts 18 is eliminated. Furthermore, since the hexagonal bolt 18 is driven through the drive bar 16 and the socket 19, instead of directly by the nut runner 20, various types of fastener members can be installed using the same nut runner 20 merely by changing the socket 19.

Second Embodiment

Figure 3:
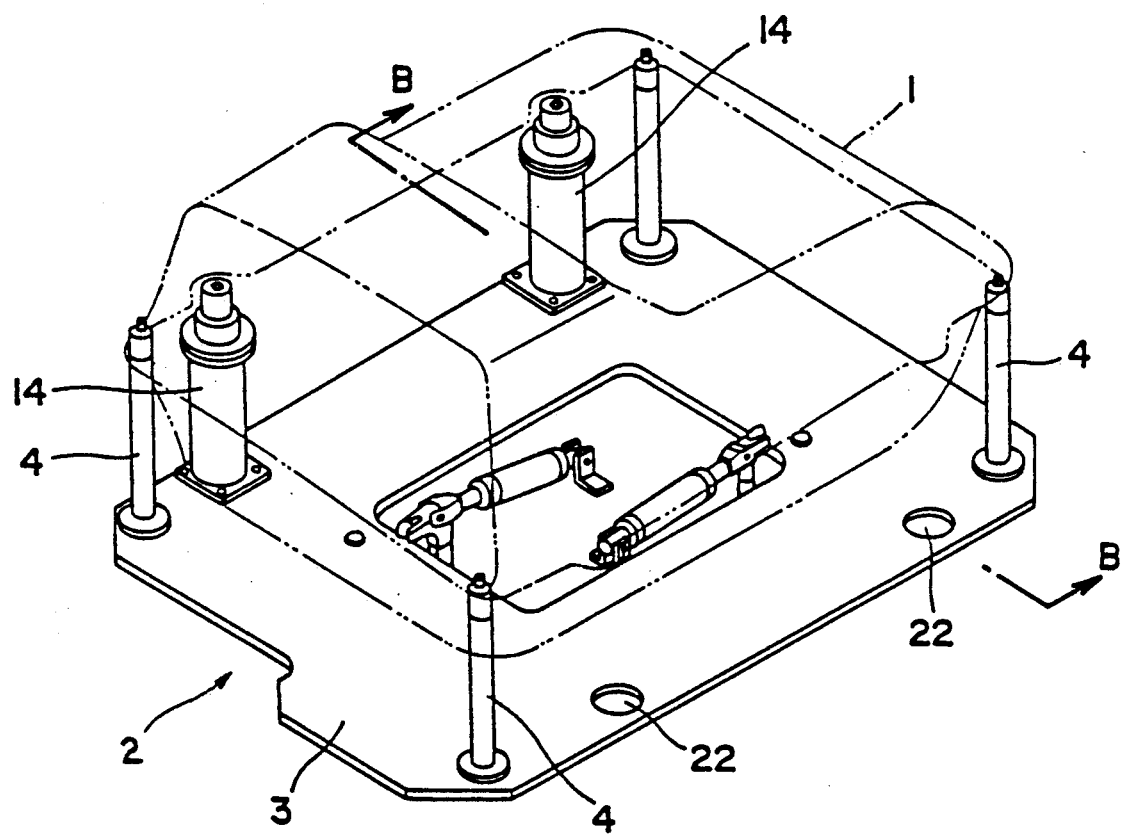
FIGS. 3 to 5 show a second embodiment of the jig pallet according to the present invention, and respectively show a schematic perspective view (FIG. 3), a schematic cross sectional view taken along line B—B in FIG. 3 (FIG. 4), and a schematic view showing the fastening operation (FIG. 5).

Referring now to FIG. 3, on the upper face of the base plate 3 of the jig pallet 2 are provided four columns 4, one at each corner, as in the first embodiment. A pair of socket holders 14 which are smaller in height than those used in the first embodiment are disposed at the left in the figure, and a pair of throughholes 22 having a diameter to allow passing of nut runners 20 are provided at the right in the figure.

Figure 4:
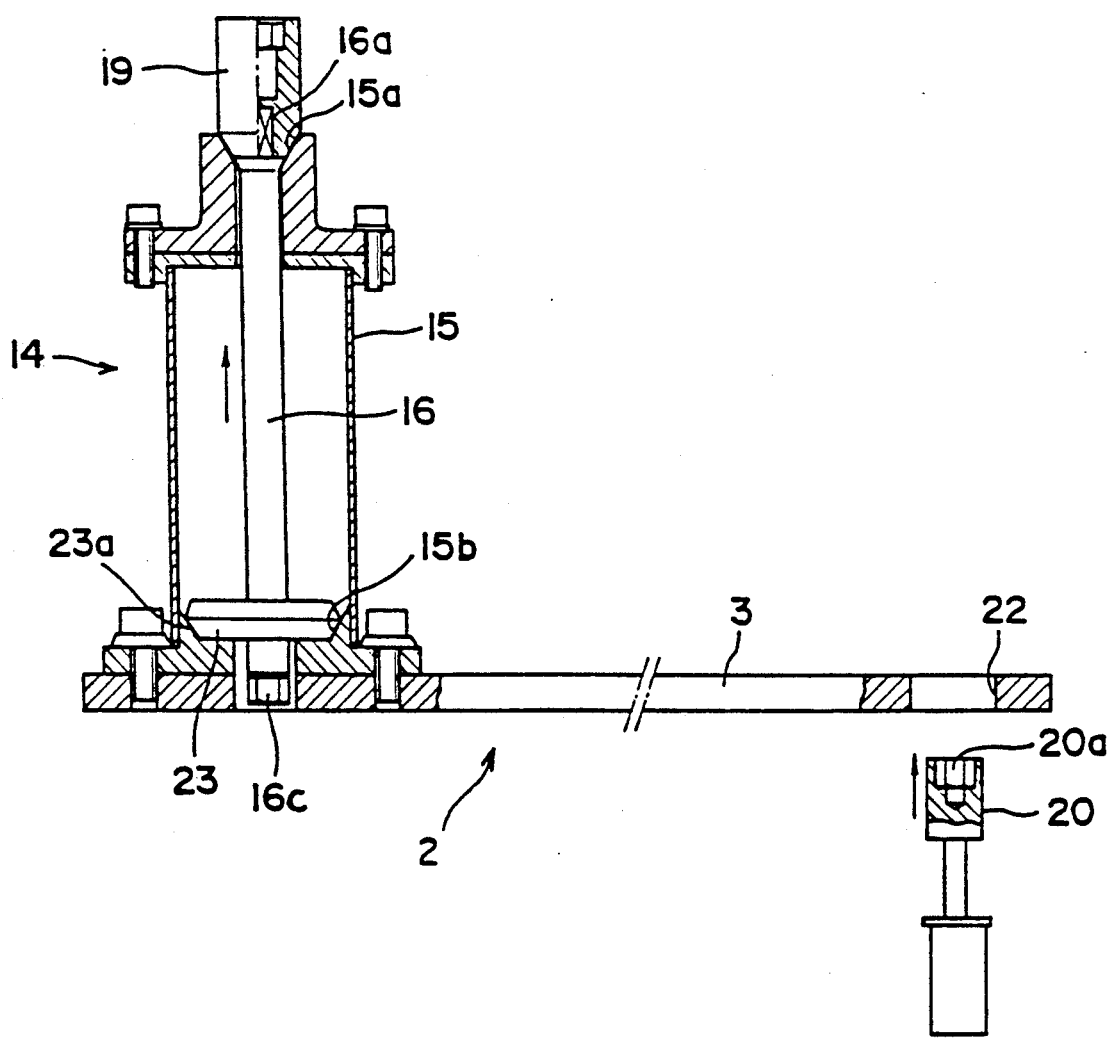

As shown in FIG. 4, the socket holder 14 of this embodiment also has a drive bar 16 in the interior of a hollow cylindrical body 15. The drive bar 16, as in the case of the first embodiment, is provided at its top end with a square drive portion 16a, which is engaged with the socket 19. A hexagonal drive portion 16c is formed at the bottom end, and a stopper ring 23 having a tapered outer periphery 23a is fixedly attached to the bar 16 immediately above the hexagonal drive portion 16c.

In this embodiment, the stopper ring 23 is made of a resin in order to reduce shocks to the body 15.

At the top and bottom of the body 15 are formed tapered portions 15a and 15b, respectively, which contact against the bottom of the socket 19 and the outer periphery 23a of the stopper ring 23. Therefore, the drive bar 16, differs from that of the first embodiment, is slidable upward. The socket 19 and the socket 20a of the nut runner 20 are of the same shape.

Figure 5:
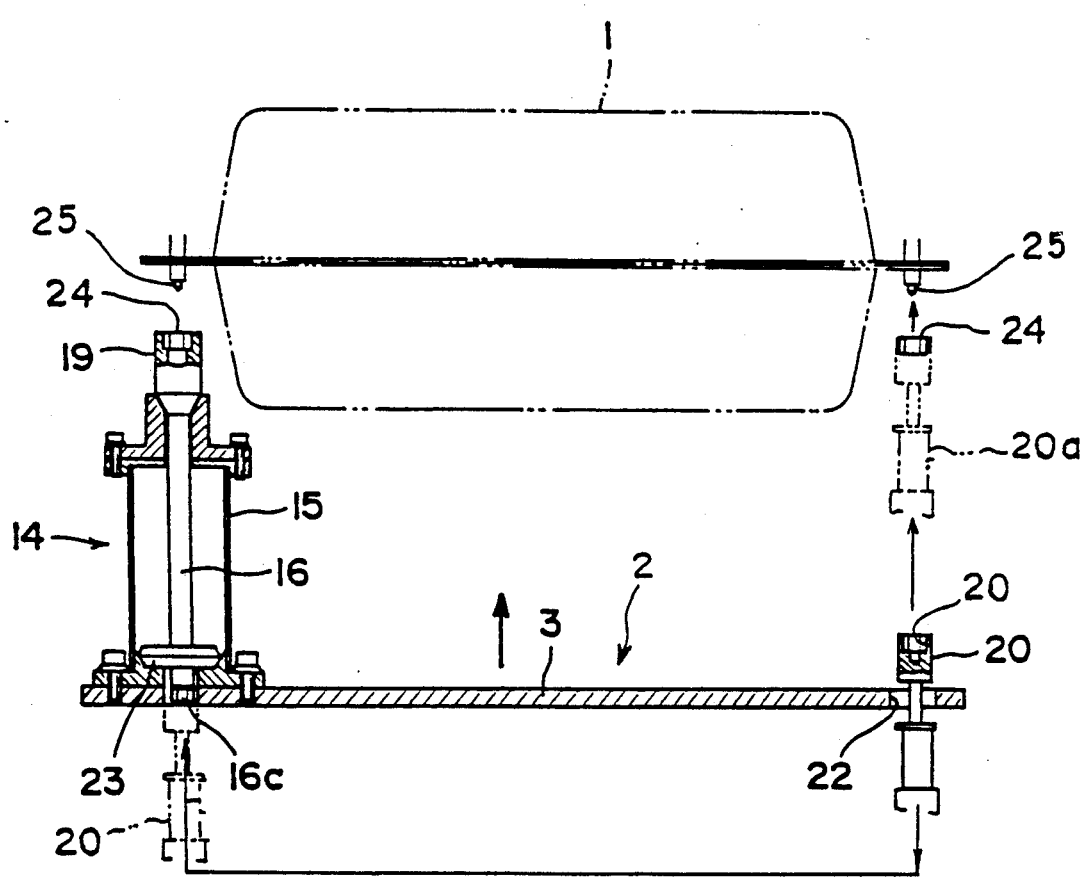

Functions of this embodiment will now be described. As shown in FIG. 5, in this embodiment the fuel tank 1 is to be secured using nuts 24, in contrast to the first embodiment, which employs hexagonal headed bolts. The nuts 24 used for fastening the front portion are previously set in the sockets 19 at the top of the socket holders 14 by an operator at a subline. Those which are used for fastening the rear portion are supplied by a nut feeder (not shown) to the hexagonal portions 20a of the nut runners 20.

Fastening procedures will now be described. When the fuel tank 1 is pressed against the lower side of the vehicle body 13, the rear portion of the tank is fastened, and then the front portion is fastened. When fastening the rear portion, the nut runner 20 moves up through the throughhole 22 as shown, and the nut 24 is pressed against a stud bolt 25 formed on the vehicle body 13 and then tightened.

The nut runner, after completion of fastening the rear portion, then moves down and then moves forward. It then moves up again to cause the socket portion 20a to engage with the hexagonal drive portion 16c at the bottom of the drive bar 16.

As described above, since the outer periphery 23a of the stopper ring 23 and the bottom of the body 15 are both tapered, the hexagonal drive portion 16c is positioned at the center of the body 15. The nut runner 20 combined integrally with the drive bar 16 then moves further upwardly to a position in which it effects fastening of the front portion.

In this embodiment, fastening of the rear portion is made by the nut runner 20 itself, which enables reduction in the number of socket holders 14 attached to the jig pallet and, in turn, a cost reduction. Compared with the prior art apparatus, the nut 24 used to fasten the front portion is manually inserted into the nut holder 19. This halves the operation steps of the nut feeder, and in turn reduces the assembly time.

Third Embodiment

Figure 6:
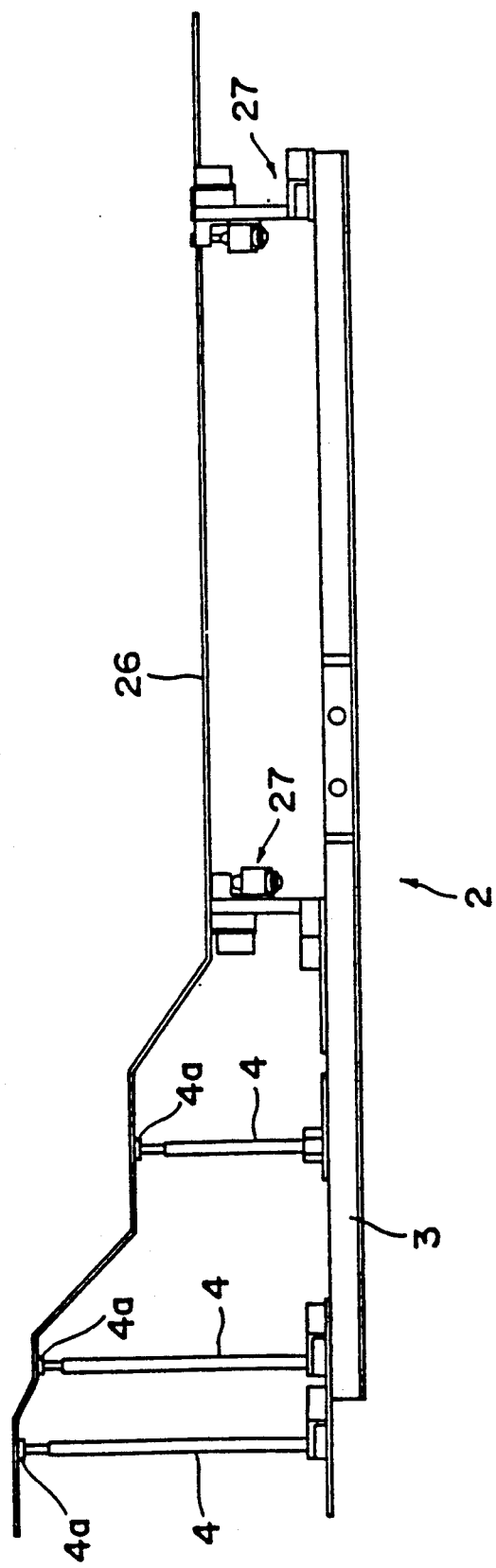
Figure 7:
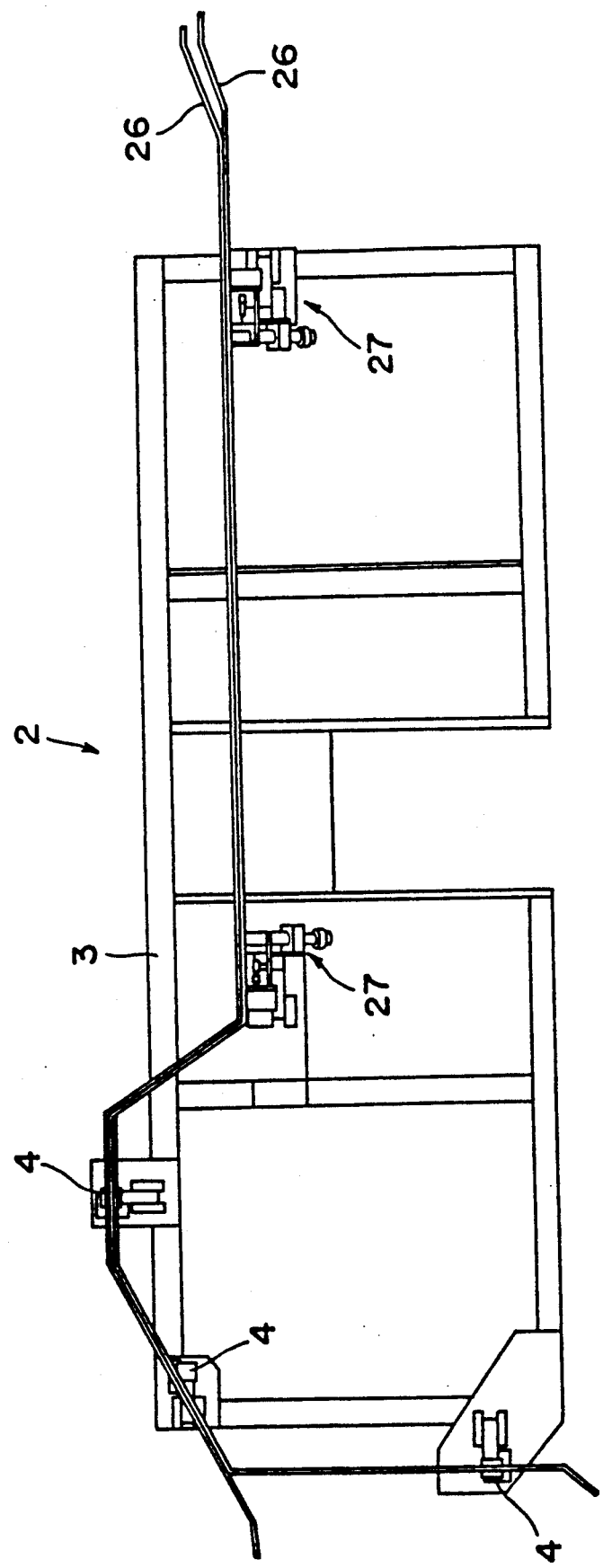

In FIG. 6 and FIG. 7, numeral 26 indicates a pipe such as a fuel pipe to be assembled into a vehicle body, which is disposed on the jig pallet 2. The jig pallet of this embodiment comprises a base frame 3 constructed from square pipes and steel plates, joined by welding or the like, with a plurality of columns 4 and a plurality of tube clamps 27 mounted on the base frame 3.

On top of the columns 4 are provided receiving portions 4a contacting against and supporting the fuel pipe 26. The tube clamps 27 include means to hold and drive bolts as fastener members and means to hold clips for the fuel pipe. Detailed structure of the tube clamps 27 will now be described.

Figure 8:
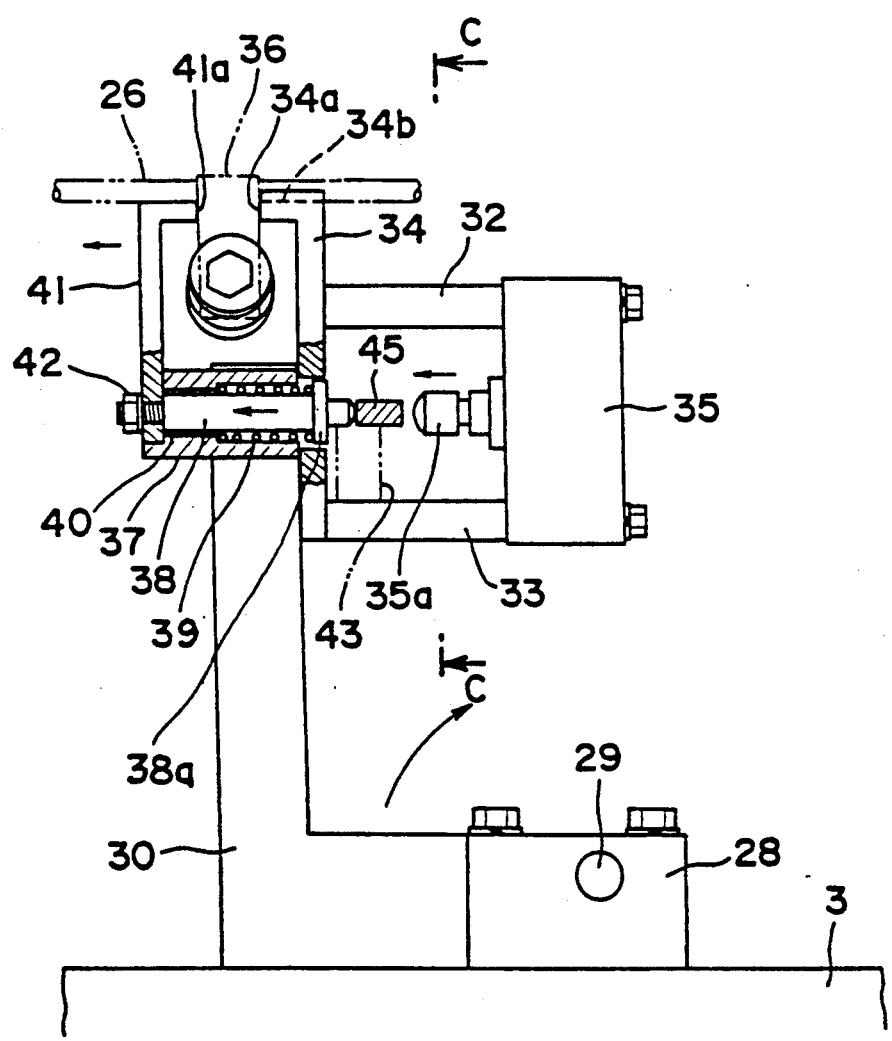
Figure 9:
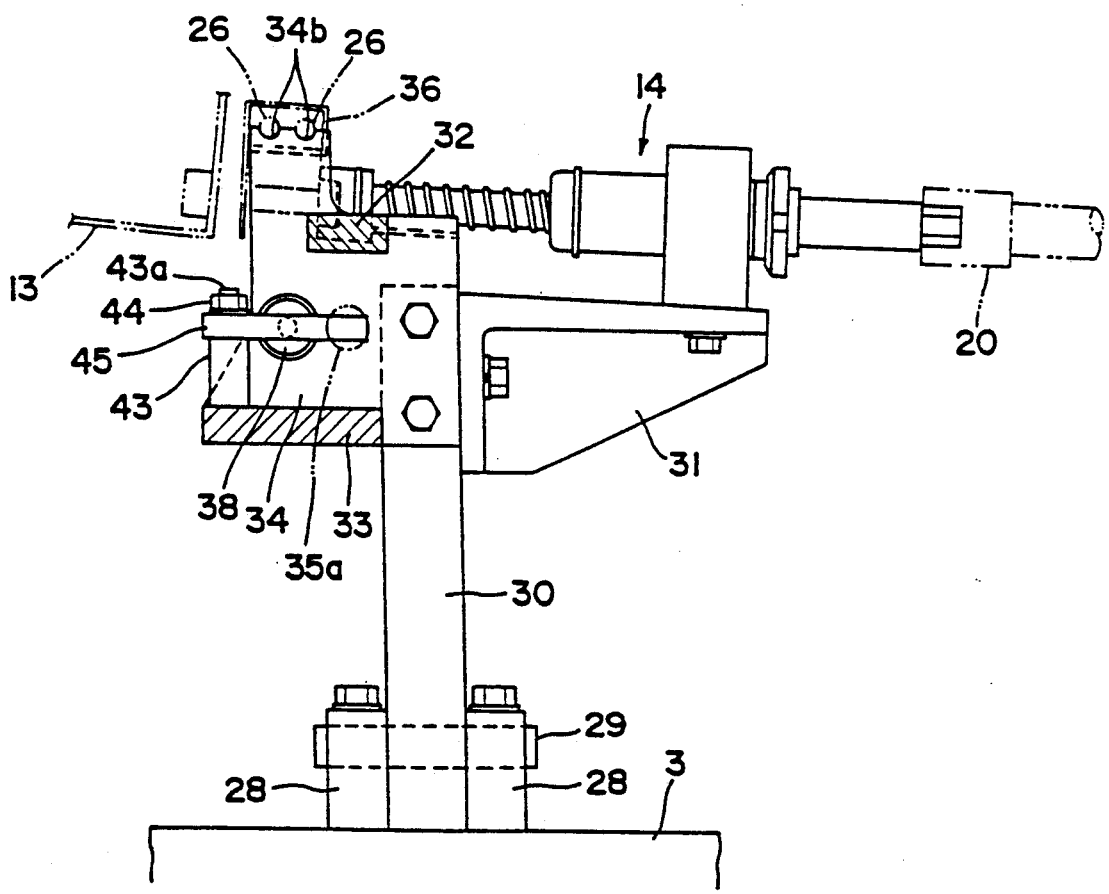
Figure 10:
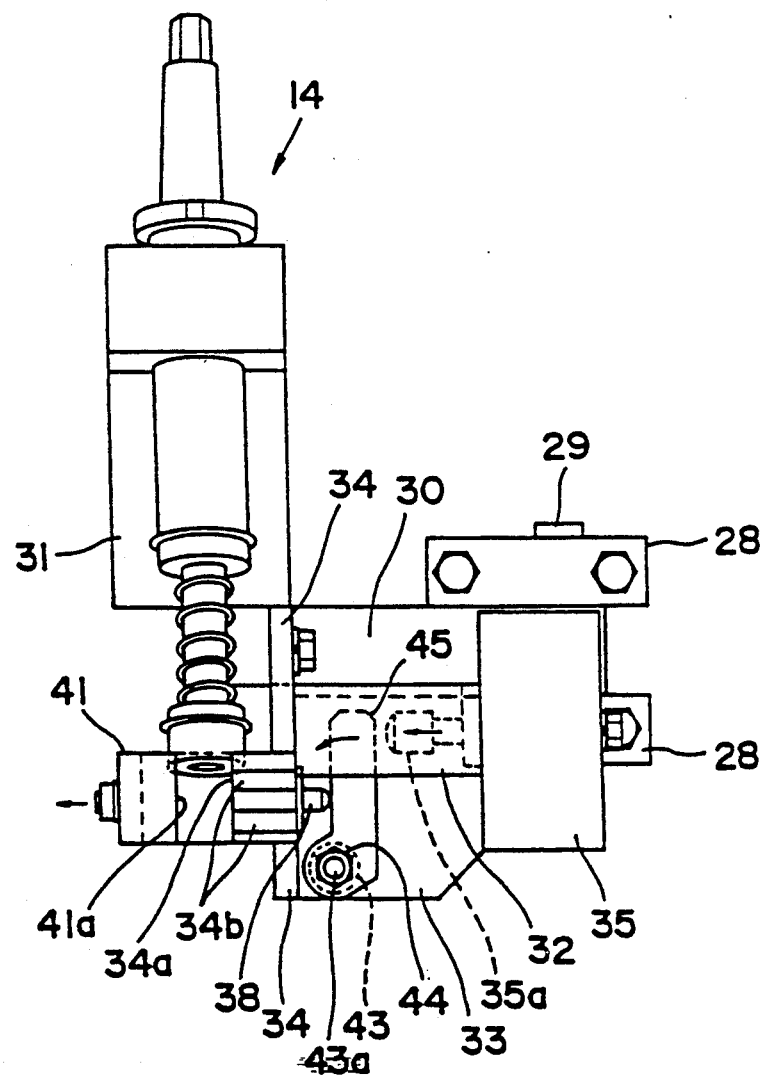

In FIGS. 8 to 10, numeral 28 indicates bracket stays secured by bolts to the base frame 3, and an L-formed bracket 30 rotatably mounted in the bracket stays 28 by a pin 29. In the vicinity of its top end, the bracket 30 has an outrigger 31 fastened with bolts, a clamp base 34 fastened with bolts, and upper and lower air cylinder stays 32 and 33. The socket holder 14 is fastened with bolts on the top face of the outrigger 31, and an air cylinder 35 is fastened with bolts at the ends of the air cylinder stays 32 and 33.

A clamping portion 34a presses against one face of a clip 36 (indicated by two-dot-bar lines), extends above the left upper end of the clamp base 34. A semi-circular guide groove 34b engaging with the fuel pipe 26 (indicated by two-dot-bar lines) is formed on the top face. A hollow clamp guide 37 is welded onto the lower left face of the clamp base 34, and a clamp rod 38 and a return spring 39 are inserted into the clamp guide 37. The clamp rod 38 is provided with a flange 38a at the right end and a threaded screw at the left end. The return spring 39 contacts against the flange 38a of the clamp rod 38 to urge the flange towards the right. In the figures, numeral 40 indicates a metal bearing. To the left end of the clamp rod 38 is integrally mounted a clamp plate 41 with a nut 42, provided with a clamping portion 41a to press against the clip 36, and the clip 36 is pinched by the clamp plate 41 and the clamp base 34.

A pivot pin 43, at the top end of which is formed a threaded screw 43a, is welded onto the upper face of the lower air cylinder stay 33, and a lever 45 is rotatably mounted by a nut 44 on the screw 43a. A drive rod 35a of the air cylinder 35 contacts against the right end face of the lever 45, and the clamp rod 38 contacts against the left face of nearly the mid-point. Therefore, when the air cylinder 35 is actuated, a pressing force is transmitted to the clamp rod 38 through the lever 45, overcoming the urging force of the rod spring 36, to move the clamp plate 41 towards the left.

Figure 11:
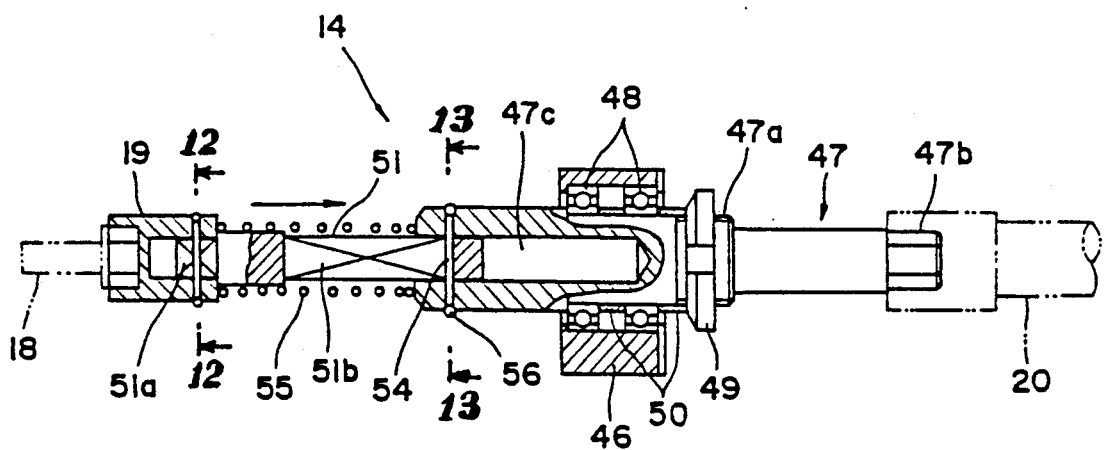

The socket holder 14 is structured as shown in FIG. 11. A sleeve shaft 47 is rotatably supported in a body 46, which is mounted to the outrigger 31, by a pair of bearings 48. In the figure, numeral 49 indicates a ring nut, which is threaded on a screw thread 47a formed on the sleeve shaft 47, and which fastens inner races of the bearings 48 through a distance collar 50. A hexagonal drive portion 47b which engages with the nut runner 20 is formed at the right end of the sleeve shaft 47, and a blind bore 47c is formed at the left end.

Figure 12:
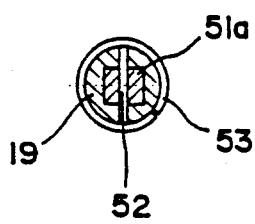
Figure 13:
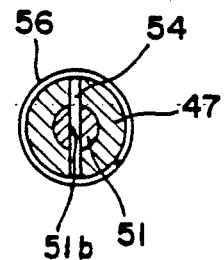

A drive bar 51 is slidably engaged in the bore 47c and is provided at its left end with a square drive portion 51a which engages with the socket 19. As shown in FIG. 12, the socket 19 is attached to the drive portion 51a by a pin 52 and a spring ring 53. A slit 51b is formed at the center of the drive bar 51, and as shown in FIG. 13, a pin 54 passing through the sleeve shaft 47 passes through a slit 51a. Thus, the sleeve shaft 47 and the drive bar 51 rotate integrally, but can move relative to each other in the axial direction. The drive bar 51 is urged into an extended position by a coil spring 55 provided around the drive bar 51. In FIG. 13, numeral 56 indicates a spring ring to prevent the pin 54 from falling off.

Functions of this embodiment will now be described. As described above, the fuel pipe 26 in this embodiment is mounted to the vehicle body 13 through the clips 36. The fuel pipe 26 is positioned by placing it on the receiving portions 4a of the columns 4 and the guide groove 34b of the clamp base 34. Then the air cylinder 35 is actuated to retract the clamp plate 41 towards the left, and clips 36 are attached to the fuel pipe 26. In this condition, spacing between the respective clamp portions 34a and 41a is increased, thereby facilitating the assembly. After the assembly of the clips 36, air is discharged from the air cylinder 35 to fix the clips 36 employing the spring force of the return spring 39.

After the clips 36 are fixed, the bolt 18 is mounted to the socket holder 14. In this embodiment, as shown in FIG. 9, in the assembled state the bolt 18 protrudes from a bolt hole (not shown) of the clip 36. Therefore, when the bolt 18 is mounted, the socket 19 is moved once to the right against the spring force of the coil spring 55, and the bolt 18 is inserted.

After completion of the setting, the jig pallet 2, and in turn the fuel pipe 26, are positioned with respect to the vehicle body 13 by a carrying arm (not shown).

Figure 14:
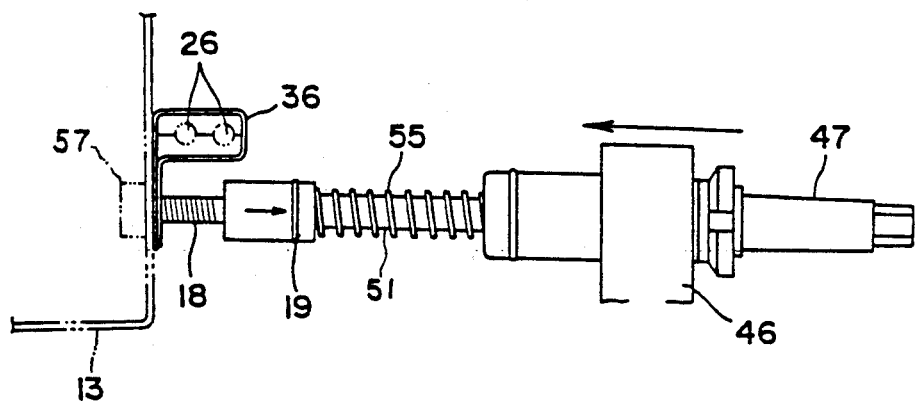
Figure 14:
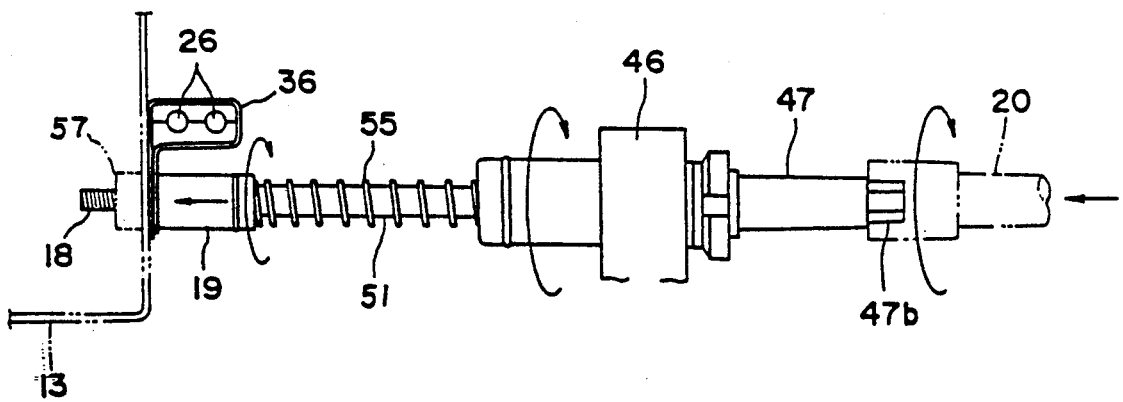
Figure 15:
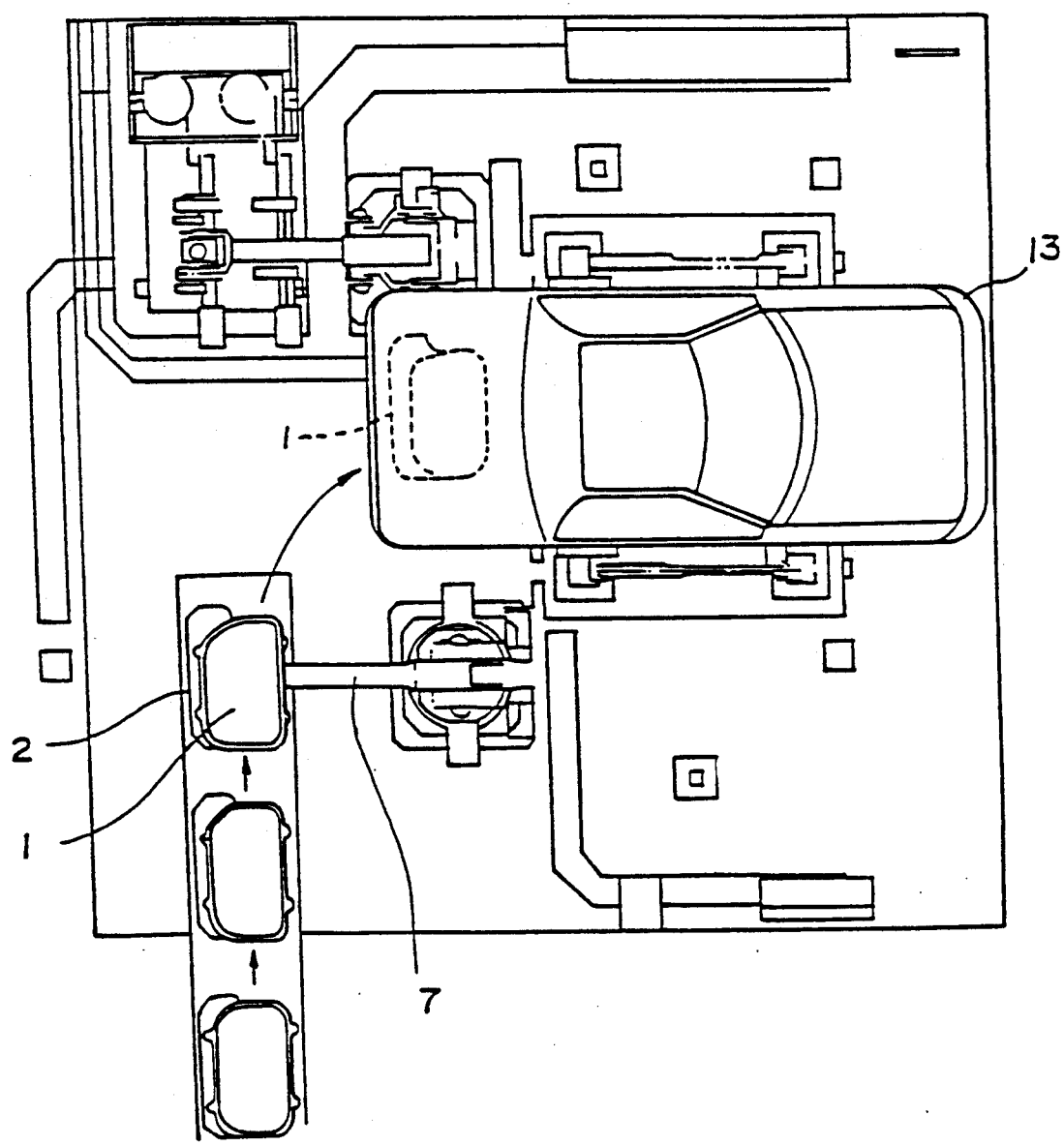
FIG. 15 is a schematic entire view showing a fuel tank mounting device for automobiles.
Figure 16:
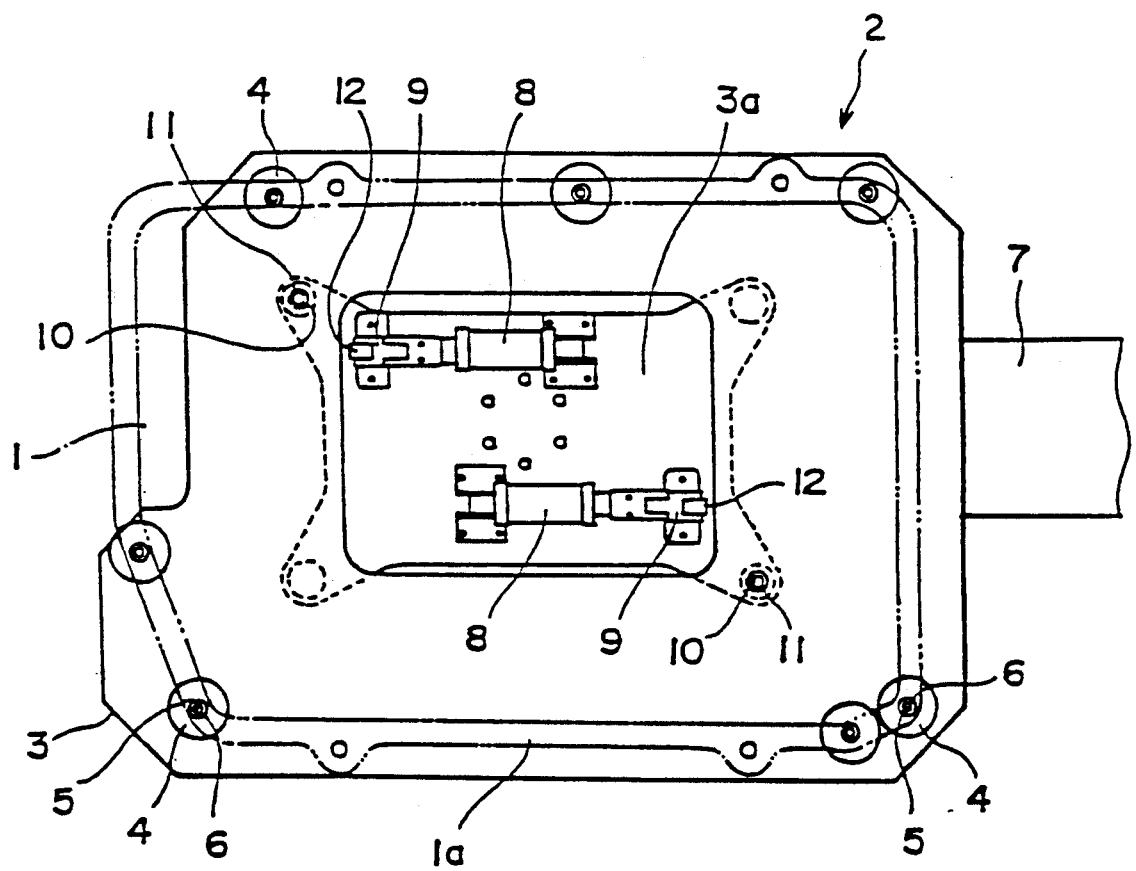
FIG. 16 and FIG. 17 are a schematic plan view and a side view, respectively, of a prior art jig pallet.
Figure 17:
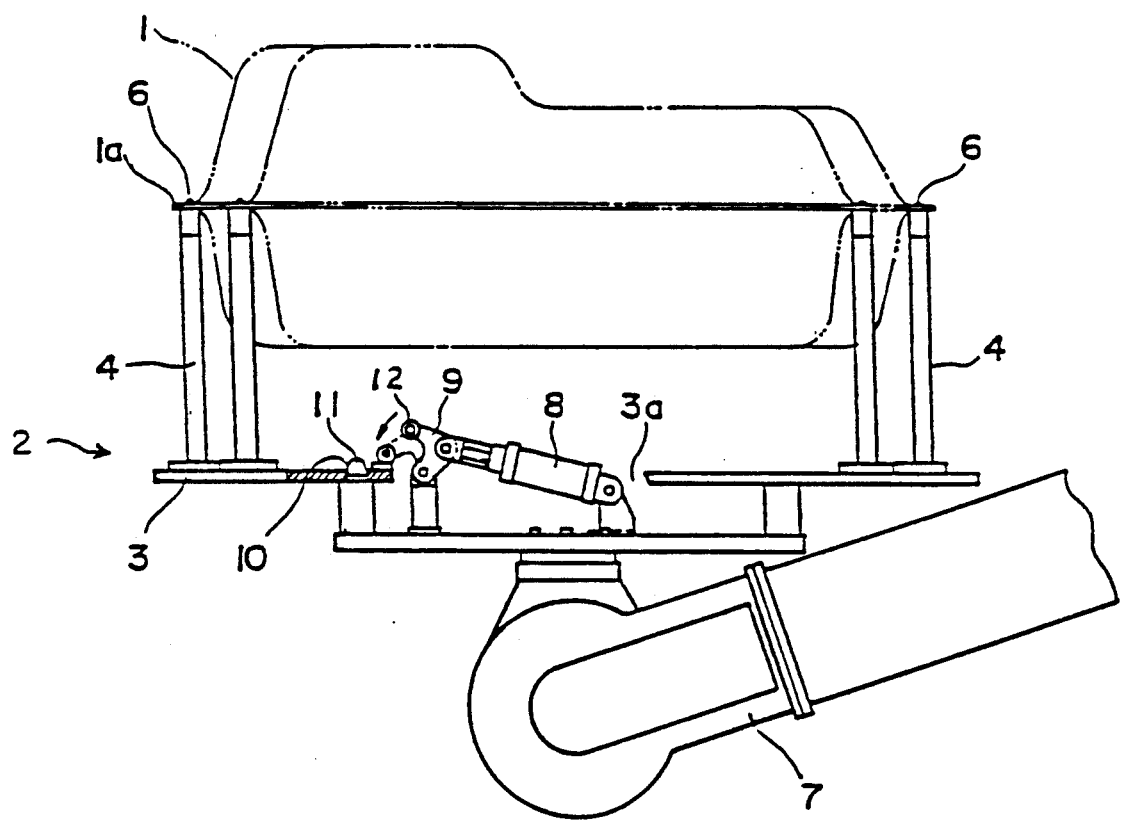

As shown in FIG. 14A, the bolt 18 is contacted against a weld nut 57 at the vehicle body 13 side and pressed, and the socket 19 with the drive bar 51 moves towards the sleeve shaft 47 side while compressing the coil spring 55.

Then, as shown in FIG. 14B, the nut runner 20 moves to the sleeve shaft 47 to engage with the hexagonal drive portion 47a and rotate it. This rotational force is transmitted through the drive bar 51 and the socket 19 to the bolt 18, and the bolt 18 is threaded into the weld nut 57. The bolt 18 moves towards the vehicle body 13 side as the bolt is threaded, however, since the socket 19 is also urged by the coil spring 55, it is moved together with the bolt 18.

After completion of tightening of the bolt 18, the air cylinder 35 is actuated to move the clamp plate 41 to the left in FIG. 8 to release the clip 36.

Now the embodiments of the present invention have been described. However the present invention is not restricted to the above embodiments. For example, the columns 4 used in the first embodiment can be eliminated, and instead the fuel tank 1 can be held only by the socket holders 14, and the assembled parts in the first and second embodiments may alternatively be other parts than the fuel tank. Furthermore, in the third embodiment, since the linkage between the bracket stay 28 and the tube clamp 27 is accomplished by the pin 29, another type of tube clamp different from the shown example may be mounted to the base frame 3 according to the clip mounting angle, and the configuration of the third embodiment can also be applied to any devices other than the fuel pipe mounting device.

What is claimed is:

1. A jig pallet for carrying and positioning parts relative to an assembled member, comprising:
   a jig pallet main body;
   fastener member holding means mounted on said jig pallet main body and driven by drive means separate from said main body, said drive means being operative to rotate said fastener member holding means to mount a said part to a said assembled member; and,
   clip holding means for holding clips in engagement with said assembled member, said clip holding means being mounted adjacent said fastener member holding means, so that a fastener held in said fastener member holding means can be employed to mount a said clip to said assembled member.

2. The jig pallet as claimed in claim 1, wherein said clip holding means is structured so as to hold and release said clip under the control of a return spring and an actuator.

3. The jig pallet as claimed in claim 1, wherein said fastener member holding means comprises a body fixed to said jig pallet, and a drive bar rotatably supported by bearings in said body and provided at one end with a drive portion connecting to a socket for holding a fastener member and at the other end with a connecting portion connecting to a drive portion of said external drive means.

4. The jig pallet as claimed in claim 3, wherein said drive bar is supported rotatably and also axially in the axial direction of said body.

5. The jig pallet as claimed in claim 4, wherein said drive bar is provided at its one end with a drive portion connecting to a socket for holding said fastener members and at the other end with a connecting portion connecting to a drive portion of said external drive means, and is further provided with a stopper ring engagable with a lower portion of said body for centering said drive bar.

* * * * *